(12) United States Patent
Ban et al.

(10) Patent No.: US 6,293,117 B1
(45) Date of Patent: Sep. 25, 2001

(54) AIR CONDITIONING SYSTEM

(75) Inventors: Takashi Ban; Toshiro Fujii; Takanori Okabe; Yoshiyuki Nakane, all of Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/412,443

(22) Filed: Oct. 4, 1999

(30) Foreign Application Priority Data

Oct. 5, 1998 (JP) .................................................. 10-283119

(51) Int. Cl.$^7$ ................................. F25B 1/00; B60H 1/03
(52) U.S. Cl. ........................................ 62/228.3; 62/228.5
(58) Field of Search ............................... 62/196.3, 228.3, 62/228.5, 228.1, 196.1, 196.2; 417/307, 311

(56) References Cited

U.S. PATENT DOCUMENTS

| | | | |
|---|---|---|---|
| 4,905,477 | * | 3/1990 | Takai .................................... 62/196.3 |
| 5,189,886 | * | 3/1993 | Terauchi ............................... 62/228.5 |
| 5,694,784 | * | 12/1997 | Frey et al. ........................... 62/228.5 |

FOREIGN PATENT DOCUMENTS

| | | |
|---|---|---|
| 5-223357 | 8/1993 | (JP) . |
| 7-19630 | 1/1995 | (JP) . |
| 10-47242 | 2/1998 | (JP) . |

\* cited by examiner

*Primary Examiner*—Harry B. Tanner
(74) *Attorney, Agent, or Firm*—Morgan & Finnegan, LLP

(57) ABSTRACT

An air conditioning system includes an compressor 110 having a driving chamber 110, a suction port 116 and a discharge port 121, a first passage 107 that connects the discharge port 121 to the driving chamber 110 by opening a capacity control valve 140, a second passage 105 that connects the driving chamber 110 to the suction port 116 and a driving means 130 that can change the output discharge capacity of the compressor by changing the pressure in the driving chamber 110. The refrigerant can be released from the driving chamber 110 to the suction port 116 separately from the second passage 105 if the driving chamber reaches a predetermined high-pressure state. In such an air conditioning system, abnormally high pressure problems are overcome that utilizes a hot gas bypass heater. In particular, heating performance is improved, because high pressure refrigerant is not released from the hot gas bypass heater circuit into the cooling circuit. Further, an excessively high-pressure state in the driving chamber 110 can be prevented.

13 Claims, 6 Drawing Sheets

AIR CONDITIONING SYSTEM

BACKGROUND OF THE INVENTION

1. Field of the Invention

The present invention relates to an air conditioning system that utilize refrigerants and a compressor, and particularly to an air conditioning system that can prevent compressor driving chamber from reaching an abnormally high-pressure state.

2. Description of the Related Art

A known air conditioning system is disclosed in Japanese Patent Application No. 7-19630 and includes a compressor 1, a cooling circuit 51, a heating circuit 52 and a controller 83, as shown in FIG. 1. The cooling circuit 51 includes a condenser 55, a first expansion valve 57 and a heat exchanger 59 provided on a passage connecting a discharge port D to a suction port S of the compressor 1. High pressure refrigerant discharged from the discharge port D of the compressor 1 is drawn through the above respective devices and back to the compressor 1.

The heating circuit 52 includes a bypass passage 52a extending from the discharge port D of the compressor 1 to a second expansion valve 63 provided within the bypass passage 52a and to the heat exchanger 59. The high pressure refrigerant discharged from the compressor 1 is not directed to the condenser 55, but rather is drawn by the compressor 1 through the second expansion valve 63 and the heat exchanger 59. Such a heating circuit 52 is generally known as a hot gas bypass heater.

The operation of the cooling circuit 51 and the heating circuit 52 is changeably selected by opening and closing selector valves 53a and 53b, which opening and closing operations are performed by the controller 83.

Because the refrigerant discharge pressure is higher when the heating circuit 52 is used than when the cooling circuit 51 is used, the air conditioning system must operate in a high pressure state when the heating circuit 52 is utilized. An abnormally high-pressure state may be created if the output discharge capacity of the compressor 1 temporarily increases during the operation of the heating circuit 52. A refrigerant releasing passage 91 having a pressure relief valve 93 is provided in order to release excess pressure from the air conditioning system, if an abnormally high pressure state is reached. The refrigerant releasing passage 91 is connected to the heating circuit 52 and the cooling circuit 51 and the pressure relief valve 93 can be opened to release the refrigerant from the heating circuit 52 into the cooling circuit 51 when the refrigerant discharge pressure abnormally increases during the operation of the heating circuit 52.

Because the cooling circuit 51 and the heating circuit 52 are alternatively selected by the selector valves 53a and 53b, the refrigerant is released into the cooling circuit 51 which is not used during operation of the heating circuit 52, thereby preventing the discharge pressure at the heating circuit 52 from increasing abnormally.

However, because the refrigerant in the heating circuit 52 is released into the cooling circuit 51 whenever the discharge pressure abnormally increases, the amount of refrigerant in the heating circuit 52 is reduced and heating performance may be reduced. Moreover, because the high pressure refrigerant is wastefully released from the heating circuit, energy efficiency is reduced.

Another variable displacement compressor is disclosed in Japanese Patent Application No. 10-47242. Although this compressor is not explicitly shown in the drawings, a connecting passage having a capacity control valve is provided between a discharge port and a driving chamber (also known as the crank case) in a housing such that refrigerant is released from the discharge port into the driving chamber when the capacity control valve is opened. Moreover, the driving chamber and a suction port communicate with each other such that the refrigerant in the driving chamber is sent to the suction port. When the discharge pressure is excessively high or suction pressure is excessively low in the compressor, the capacity control valve is opened to release the refrigerant from the discharge port into the driving chamber, thereby increasing the pressure in the driving chamber. As a result, the output discharge capacity of the compressor decreases and thus, the discharge pressure decreases and the suction pressure increases. In order to maintain the output discharge capacity decreasing effect by maintaining pressure in the driving chamber, a throttle can be provided between the driving chamber and the suction port.

If the variable displacement compressor disclosed in Japanese Patent Application No. 10-47242 is employed in an air conditioning system having the hot gas bypass heater circuit disclosed in Japanese Patent Application No. 7-19630, a problem can occur due to a combination of a characteristic of the variable displacement compressor and a characteristic of the hot gas bypass heater.

As described above, because the high-pressure refrigerant is released from the discharge port into the driving chamber in order to decrease the output discharge capacity, the pressure in the driving chamber increases significantly. Although the driving chamber and the suction port communicate with each other, it takes time to send the refrigerant from the driving chamber to the suction port and the pressure in the driving chamber is maintained in a high-pressure state during that time. Especially in the above case in which a throttle is provided between the driving chamber and the suction port, because a long time is required to send the refrigerant from the driving chamber to the suction port, the high-pressure state in the driving chamber continues for a long time.

Therefore, in the known variable displacement compressor, the driving chamber seal is designed based on the assumption that the interior of the driving chamber will be subjected to high-pressure states. Especially during operation of the heating circuit (hot gas bypais heater) which uses the refrigerant at higher pressure as compared with the cooling circuit, the pressure of the refrigerant released from the discharge port into the driving chamber may increase over an expected steady-state value in some cases and the interior of the driving chamber may reach an excessively high-pressure state in such cases. When the excessively high-pressure state is caused in this manner, airtight seal of the driving chamber is degraded and the durability of the compressor may be also degraded.

SUMMARY OF THE INVENTION

It is, therefore, an object of the present invention to provide an improved air conditioning system that can alleviate abnormal high pressure state more sufficiently.

Preferably, an air conditioning system includes an compressor having a driving chamber, a suction port, a discharge port, a first passage that connects the discharge port to the driving chamber by opening a capacity control valve, a second passage that connects the driving chamber to the suction port and a driving means that can change the output discharge capacity of the compressor by changing the pressure in the driving chamber. Further, the refrigerant may preferably be released from the driving chamber to the suction port separately from the second passage when the driving chamber reaches a predetermined high-pressure state.

In such an air conditioning system, abnormally high pressure problems are overcome. In particular, heating performance is improved, because high pressure refrigerant is not released from the hot gas bypass heater circuit into the cooling circuit. Further, an excessively high-pressure state in the driving chamber can be prevented.

Other objects, features and advantages of the present invention will be readily understood after reading the following detailed description together with the accompanying drawings and the claims.

DETAILED DESCRIPTION OF THE INVENTION

Figure 1:
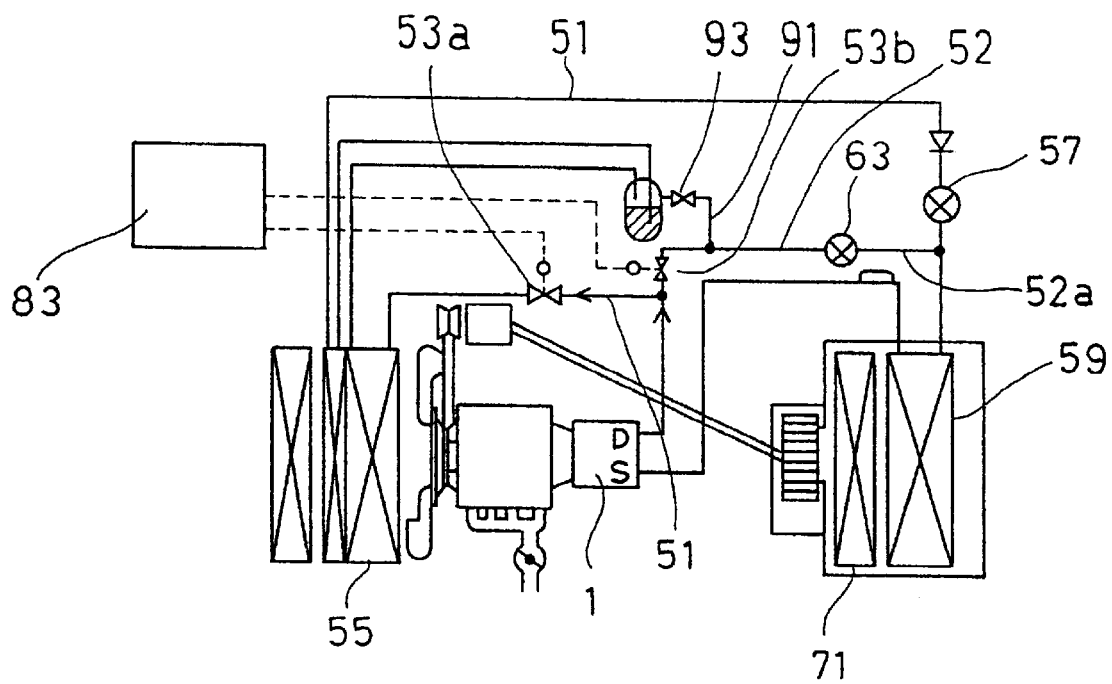
FIG. 1 shows a structure of a known air conditioning system.

In a first representative example, the air conditioning system may include a compressor, a heating circuit, and driving chamber decompression means. The compressor may have a driving chamber, a suction port for drawing refrigerant into the compressor, a discharge port for discharging compressed refrigerant, a first passage for connecting the discharge port to the driving chamber by opening a capacity control valve, a second passage for connecting the driving chamber to the suction port, and driving means for changing the output discharge capacity of the compressor by changing the pressure in the driving chamber.

A driving chamber decompression means is preferably provided to release refrigerant from the driving chamber to the suction port separately from the second passage when the driving chamber is brought into a predetermined high-pressure state.

In such a variable displacement compressor, the output discharge capacity can be decreased by releasing the refrigerant from the discharge port into the driving chamber. The discharge port and the driving chamber may be connected by the first passage. The first passage is opened when the capacity control valve is opened and the refrigerant is released from the discharge port into the driving chamber. The driving chamber and the suction port may be connected to each other by the second passage at all times and the refrigerant in the driving chamber is released to the suction port.

Increasing the pressure in the driving chamber can decrease the output discharge capacity of the compressor. For this purpose, the capacity control valve is opened and the high-pressure refrigerant is released from the discharge port into the driving chamber through the first passage to increase the pressure in the driving chamber. It is preferable to provide a throttle to the second passage such that the pressure in the driving chamber becomes high enough to decrease the output discharge capacity. When the high-pressure refrigerant is released from the discharge port into the driving chamber so as to decrease the output discharge capacity, the pressure in the driving chamber increases and the high-pressure state in the driving chamber is maintained until the high pressure refrigerant in the driving chamber is released to the suction port through the second passage.

The driving chamber is designed based on the assumption that the driving chamber will reach high-pressure states. Because the high-pressure refrigerant is released from the discharge port into the driving chamber, the pressure in the driving chamber may exceed an expected upper limit pressure to bring the driving chamber into the excessively high-pressure state when pressure of the refrigerant released into the driving chamber is excessively high. Especially during operation of the heating circuit, the excessively high-pressure state is liable to occur because the discharge pressure of the refrigerant is higher during operation of the heating circuit than during operation of the cooling circuit. In order to prevent degradation of airtight seal of the driving chamber and the durability of the compressor due to the high pressure, the driving chamber decompression means is provided to release refrigerant from the driving chamber to the suction port. This driving chamber decompression means is separate from the second passage that connects the driving chamber and the suction port at all times. As a result of the release by the driving chamber decompression means, the pressure in the driving chamber is decreased and the excessively high-pressure state in the driving chamber is alleviated.

In a second representative example, a third passage is provided to extend from the driving chamber to the suction port and a driving chamber decompression valve is provided within the third passage. For example, the third passage and the driving chamber decompression valve are the features corresponding to the driving chamber decompression means described in the first example while these features does not limit the scope of the interpretation of the driving chamber decompression means. The driving chamber decompression valve is opened by a difference between the suction pressure and the pressure in the driving chamber when the difference increases. In this example, the driving chamber decompression means included both the second passage discussed above as well as the third passage and the driving chamber decompression valve, which can be opened by increased pressure differences to open the third passage and thereby connect the driving chamber to the suction port. As a result, the refrigerant is released from the driving chamber to the suction port through the third passage in order to alleviate the high-pressure state in the driving chamber. Because the driving chamber decompression valve is opened by the pressure difference between the driving chamber and the suction pressure, the high-pressure state in the driving chamber can be alleviated by utilizing only the pressures within the air conditioning system. The airtight seal can be further improved and the structure of the air conditioning system can be simplified.

In a third representative example, a third passage extends from the driving chamber to the suction port and a driving chamber decompression valve is provided within the third passage. The driving chamber decompression valve is opened by a difference between atmospheric pressure or vacuum pressure and the pressure in the driving chamber when the difference increases. In this example, the driving chamber decompression means includes the second passage described above as well as the third passage and the driving chamber decompression valve, which can be opened by a pressure difference between the atmospheric pressure or a vacuum pressure and the driving chamber pressure. When the difference increases sufficiently, the third passage is opened to connect the driving chamber to the suction port. In other words, variation of the difference between both pressures accurately reflects variation of the pressure in the driving chamber with respect to the atmospheric pressure or the vacuum pressure, which is a fixed quantity. Therefore, the high-pressure state can be judged accurately.

A cooling circuit also may preferably be provided in the present air conditioning systems that has a condenser disposed on a path extending from the discharge port to the suction port of the compressor and a heat exchanger may be disposed downstream from the condenser. Preferably, the heating circuit has a bypass passage extending from the discharge port to the heat exchange.

Figure 3:
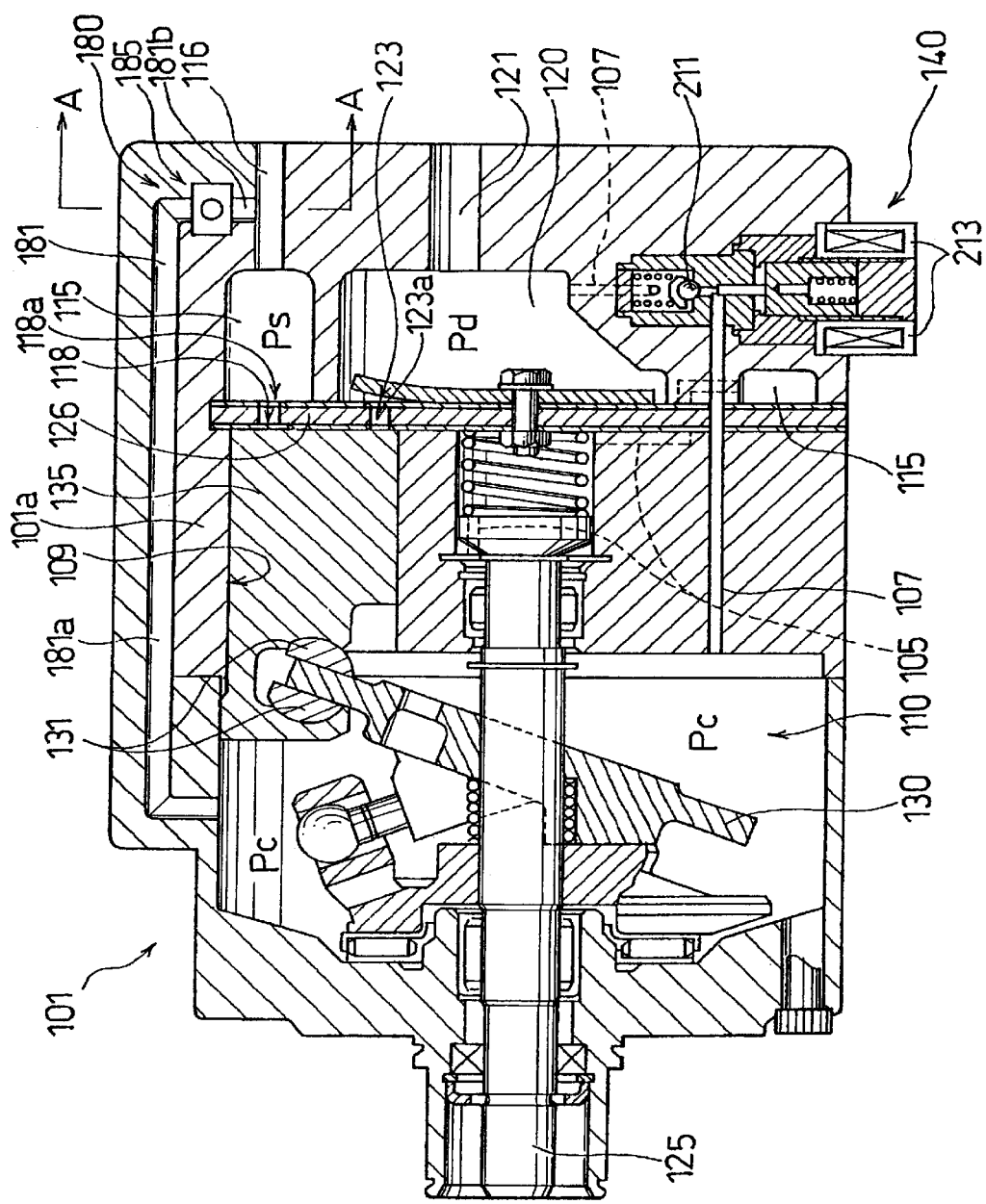
FIG. 3 shows a detailed structure of a compressor in the air conditioning system according to the first embodiment.
Figure 4:
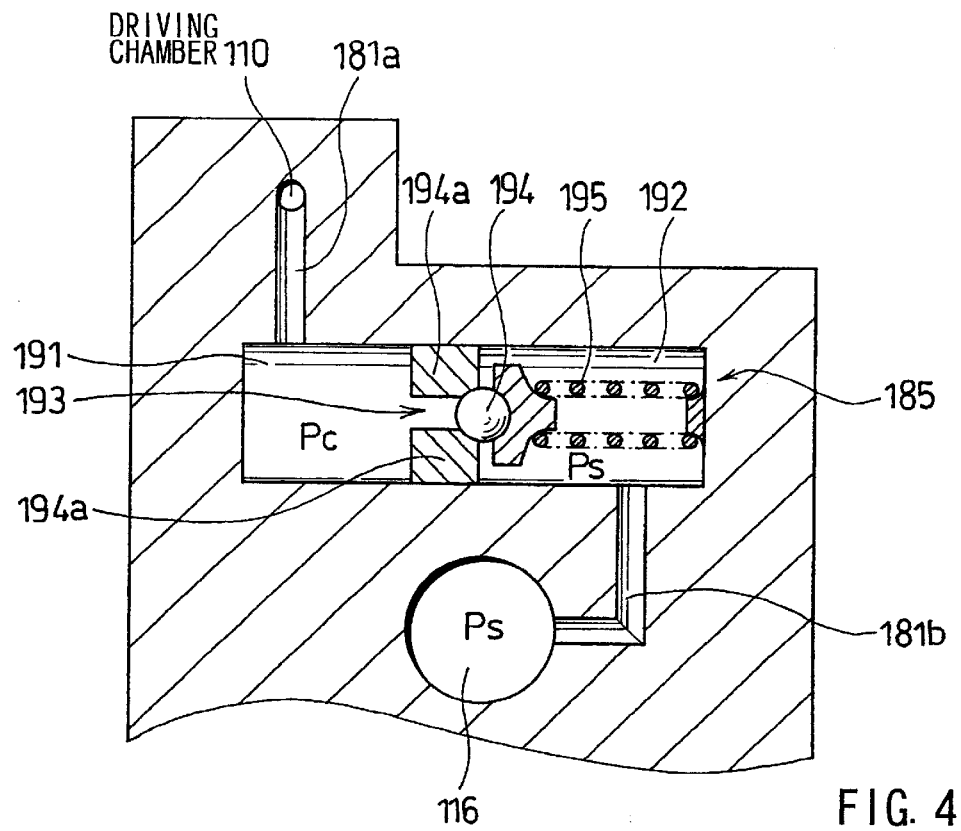
FIG. 4 shows a sectional view taken along a line A—A in FIG. 3.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.
First Detailed Representative Embodiment Referring to FIG. 2, the air conditioning system 100 may include a cooling circuit 151, a heating circuit 152 and a variable displacement compressor 101 as a driving source for both the heating and cooling circuits. A representative driving chamber decompression means is shown in FIGS. 3 and 4, but is not shown in FIG. 2 for the sake of convenience and will be described below in further detail. Such an air conditioning system 100 may be utilized in a vehicle-mounted air conditioning system. In such case, the compressor driving shaft 125 may be coupled to and driven by an automobile engine 170.

The cooling circuit 151 may be driven by high-pressure refrigerant, which is compressed by the compressor 101, and may include a condenser 155, a first expansion valve 157, a heat exchanger 159 and an accumulator 161. These devices may be disposed within a path 151a that extends from a discharge port D to a suction port S of the compressor 101. The heat exchanger 159 is also generally known as an evaporator. The heat exchanger 159 may be arranged side by side with a hot-water heater 171, which circulates hot coolant from the engine 170 through a pipe 173.

The heating circuit 152 is driven by high-temperature and high-pressure refrigerant, which is also compressed by the compressor 101, and may include a second expansion valve 163, the heat exchanger 159 and the accumulator 161. These devices may be disposed on a bypass passage 152a for introducing the refrigerant discharged from the discharge port D to the heat exchanger 159. In other words, the heating circuit 152 partially overlaps with the cooling circuit 151. Such a heating circuit 152 is also generally known as a hot-gas bypass heater.

Figure 2:
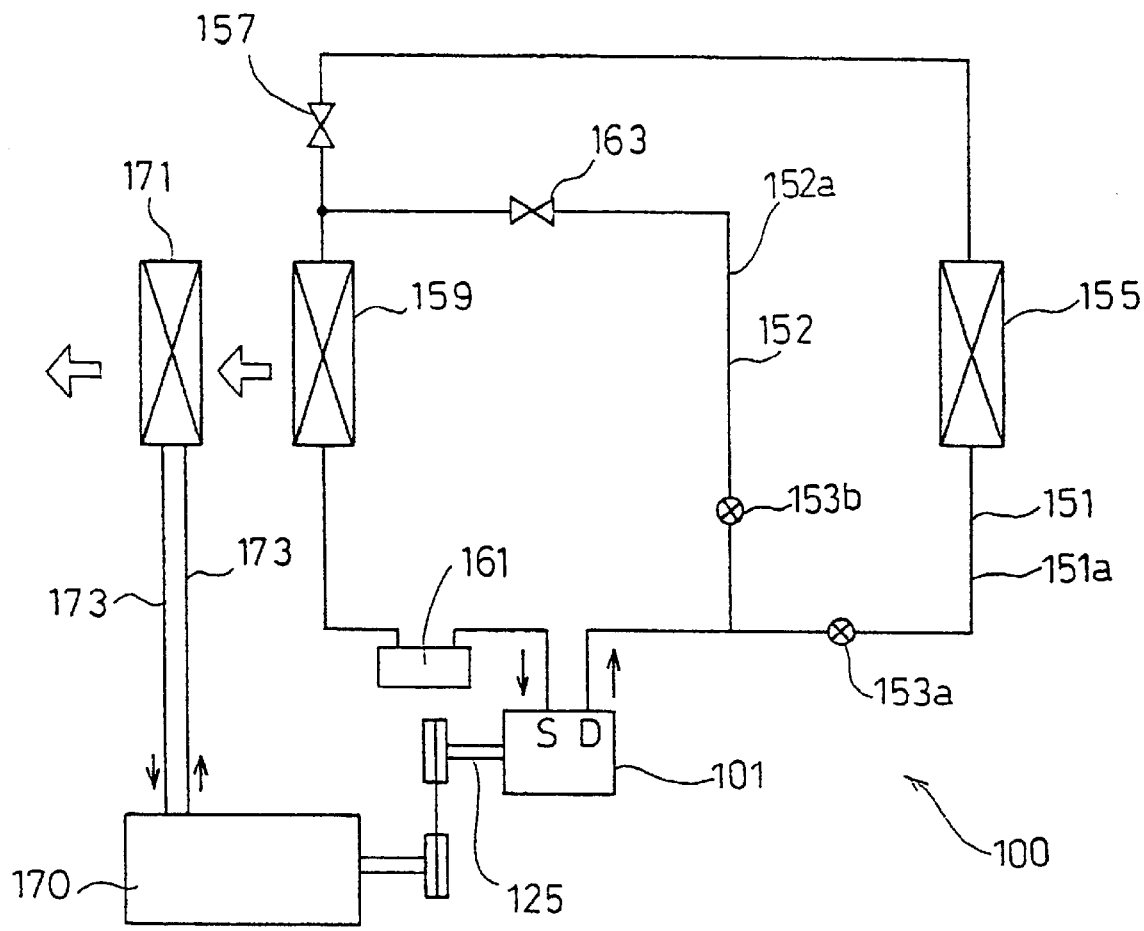
FIG. 2 shows a structure of an air conditioning system according to a first embodiment.

In FIG. 2, a first open/close valve 153a and a second open/close valve 153b may be utilized as switch valves for alternatively actuating the cooling circuit 151 and the heating circuit 152.

During operation of the cooling circuit 151, the refrigerant is compressed by the compressor 101 to attain a high temperature and high pressure state. This compressed refrigerant is sent to the condenser 155, where heat from the high-temperature refrigerant is dissipated to the outside environment and the refrigerant is liquefied. The refrigerant is decompressed by the first expansion valve 157 and sent to the heat exchanger 159 where the refrigerant absorbs outside heat and is gasified. The gasified refrigerant is returned to the compressor 101 again through the accumulator 161 for re-circulation throughout the system 100.

During operation of the heating circuit 152, the refrigerant is compressed by the compressor 101 to attain a high temperature and high pressure state. The compressed refrigerant is then decompressed by the second expansion valve 163 and sent to the heat exchanger 159, where heat from the compressed refrigerant is dissipated to the outside environment. In the heating circuit cycle, the refrigerant is constantly in a gaseous state while circulating through the heating circuit 152.

The heating circuit 152 may be used as an auxiliary heater. Heat generated by the heat exchanger 159 during operation of the heating circuit 152 may be used as an auxiliary heating source for the hot water heater 171. The heating circuit 152 also may be used to assist the coolant from the engine 170 when the coolant can not provide sufficient heat to start the engine 170 in a low-temperature environment, such as an outside air temperature of −20° C. or so.

Referring to FIG. 3, a representative compressor 101 is shown that may include a driving chamber 110 defined within a housing 101a of the compressor 101 and a swash plate 130 that is rotatably supported by the driving shaft 125 in the driving chamber 110. The swash plate 130 may be supported by the driving shaft 125 and may rotate together with the drive shaft 125. The swash plate 130 is inclined with respect to the driving shaft 125 when the driving shaft 125 rotates and the inclination angle of the swash plate 130 with respect to a plane perpendicular to the axis of rotation of the driving shaft 125 is changeable.

The peripheral edge portion of the swash plate 130 may be connected to the base portions of the pistons 135 by means of movable shoes 131. Six pistons 135 in total may be disposed around the driving shaft 125 (however, only one piston is shown in FIG. 3 for the sake of convenience) and may be laterally slide within six cylinder bores 109. The circumferential positions of the six cylinder bores 109 fixed by the compressor housing 101a.

When the swash plate 130 rotates together with the driving shaft 125 while being inclined as shown in FIG. 3, the peripheral edge of the swash plate 130 slides with respect to the piston 135 fixed in the circumferential direction. When the peripheral edge of the swash plate 130 being inclined to a position closest to the cylinder bores 109 (as shown in FIG. 3), the piston 135 reaches its deepest insertion into the cylinder bores 109. When the peripheral edge of the swash plate 130 (the peripheral edge shown in a lower part of FIG. 3) being inclined to a position furthest away from the cylinder bores 109, the piston 135 is substantially withdrawn from the cylinder bore 109. Each 360° rotation of the driving shaft 125 results in each piston 135 laterally reciprocating one time.

A suction port 118a and a discharge port 123a are defined in a bottom portion of each the cylinder bore 109. A suction valve 118 is positioned to correspond to the suction port 118a and a discharge valve 123 is positioned to correspond to the discharge port 123a. Each suction port 118a communicates with a suction chamber 115 and each the discharge port 123a communicates with a discharge chamber 120.

When the piston 135 moves to the left in FIG. 3, as a result of rotation of the swash plate 130, refrigerant is introduced from the suction opening 116 through the suction chamber 115, suction port 118a and suction valve 118 into the cylinder bore 109. When the piston 135 moves to the right in FIG. 3, as a result of further rotation of the swash plate 130, the refrigerant is compressed into a high-pressure state and discharged from a discharge opening 121 through the discharge port 123a, discharge valve 123 and discharge chamber 120.

The output discharge capacity of the compressor 101 is determined by the stroke length of the piston 135, which is determined by the degree of change in inclination angle of the swash plate 130 during each cycle. That is, the further the swash plate 130 is withdrawn from the cylinder bore 109 during each cycle, the longer the stroke length of the piston 135 will be. As the stroke length increases, the output discharge capacity of the compressor 101 also increases.

The inclination angle of the swash plate 130 is determined, in part, by the difference in pressure on the opposite sides of the piston 135, i.e., the pressure difference between driving chamber pressure and the cylinder bore pressure. Increasing or decreasing the driving chamber pressure can adjust this pressure difference.

Thus, in order to decrease the output discharge capacity, the high-pressure refrigerant is released from the discharge chamber 120 into the driving chamber 110. Due to resulting increasing in the driving chamber pressure, the swash plate 130 does not move as much in the lateral direction and the stroke length of the piston 135 decreases. Therefore, the output discharge capacity also will decrease. On the other hand, in order to increase the output discharge capacity, the refrigerant in the discharge chamber 120 is prevented from being released into the driving chamber 110. As a result, the driving chamber pressure will gradually decrease, the swash plate 130 will move further in the lateral direction and the stroke length of the piston 135 will increase. In this case, the output discharge capacity will increase.

The high-pressure refrigerant can be released from the discharge chamber 120 into the driving chamber 110 utilizing a variety of different structures. As shown in FIG. 3, a capacity changing passage 107 and a capacity control valve 140 are, in this embodiment, provided for releasing the refrigerant from the discharge chamber 120 into the driving chamber 110. The capacity control valve 140 may be a solenoid valve having a valve body 211 and a solenoid 213. The capacity control valve 140 may be opened or closed by exciting or not exciting the solenoid 213 so as to communicate or not communicate the capacity changing passage 107. Opening and closing of the capacity control valve 140 are controlled by control means (not shown in the drawings). As shown in FIG. 3, for example, the suction chamber 115 and the driving chamber 110 are connected by a bleeding passage 105 at all times.

The driving chamber 110 and the suction chamber 115 may connected by a bleeding passage 105 at all times and a throttle (not particularly shown) may be provided within the bleeding passage 105.

A driving chamber decompression means 180 for decompressing the driving chamber may include a driving chamber decompression passage 181 for connecting the driving chamber 110 to the suction opening 116 and a driving chamber decompression valve 185 provided within the driving chamber decompression passage 181.

A more detailed structure of a representative driving chamber decompression means is shown in FIG. 4, which is a sectional view taken along a line A—A in FIG. 3. The driving chamber 110 is connected to a first section chamber 191 in the driving chamber decompression valve 185 through a first driving chamber decompression passage 181a. Therefore, the pressure in the first section chamber 191 is equal to pressure Pc in the driving chamber 110. On the other hand, the suction opening 116 is connected to a second section chamber 192 through a second driving chamber decompression passage 181b. Therefore, the pressure in the second section chamber 192 is equal to suction pressure Ps. The first section chamber 191 and the second section chamber 192 are connected through a connecting passage 193 and the connecting passage 193 can be opened or closed by a valve body 194.

The valve body 194 is biased to the left, as shown in FIG. 4, by a spring 195. normally, the valve body 194 is pushed against a valve seat 194a to close the connecting passage 193. On the other hand, when the pressure Pc in the first section chamber 191 increases, the valve body 194 moves to the right, as shown in FIG. 4 and separates from the valve seat 194a to open the connecting passage 193.

The biasing force of the spring 195 is appropriately determined based upon an evaluation as to at which value of a difference between the pressure Pc in the driving chamber and the suction pressure Ps the connecting passage 193 should be opened. That is, the pressure difference is defined as an index of the abnormally high-pressure state in the driving chamber such that the first section chamber 191 should be connected to the second section chamber 192 to release the refrigerant.

During operation of the cooling circuit 151 shown in FIG. 2, the refrigerant which is compressed by the compressor 101 into a high pressure state is circulated to the compressor 101 again through the condenser 155, the first expansion valve 157, the heat exchanger 159, and the accumulator 161 for recirculation. During operation of the heating circuit 152, the refrigerant compressed by the compressor 101 into a high pressure state is circulated to the compressor 101 again through the second expansion valve 163, the heat exchanger 159, and the accumulator 161 on the bypass passage 152a for recirculation.

During operation of the heating circuit 152, the capacity control valve 140 shown in FIG. 3 opens when the discharge pressure of the refrigerant increases excessively in order to open the capacity changing passage 107 and release the refrigerant from the discharge chamber 120 into the driving chamber 110, thereby increasing pressure in the driving chamber 110. As a result, the inclination angle of the swash plate 130 decreases, the stroke length of the piston 135 decreases and the output discharge capacity decreases to decrease the discharge pressure, thereby resolving the abnormally high-pressure state of the discharge pressure.

On the other hand, when the discharge pressure of the refrigerant is not in the abnormally high-pressure state, the capacity control valve 140 is closed to bring the capacity changing passage 107 into the non-communicating state such that the refrigerant is not released from the discharge chamber 120 into the driving chamber 110.

When the discharge pressure is brought into the abnormally high-pressure state, the capacity control valve 140 is opened to release the refrigerant from the discharge chamber 120 into the driving chamber 110. The driving chamber 110 and the suction chamber 115 are connected by the bleeding passage 105 at all times and the refrigerant in the driving chamber 110 is released into the suction chamber 115 through the bleeding passage 105. As described above, the throttle may be provided within the bleeding passage 105 and the high-pressure refrigerant is remains within the driving chamber 110 to bring the driving chamber 110 into the high-pressure state until the refrigerant in the driving chamber 110 is released into the suction chamber 115.

This air conditioning system is designed based on the inherent assumption that the interior of the driving chamber 110 will reach a high-pressure state. In order to decrease the output discharge capacity by releasing the high-pressure refrigerant from the discharge chamber 120 into the driving chamber 110, the airtight seal is not especially damaged, even if the pressure in the driving chamber increases to some extent.

Therefore, even if the high-pressure refrigerant is released from the discharge chamber 120 into the driving chamber 110 so as to decrease the output discharge capacity, when the pressure Pc in the driving chamber is not in an excessively high-pressure state during operation of the heating circuit, the pressure Pc in the first section chamber 191 biases the valve body 194 to the right as shown in FIG. 4. A resultant of the pressure Ps in the second section chamber 192 and the biasing force of the spring 195 stops the rightward movement of the valve body 194. Thus, the valve body 194 contacts the valve seat 194a and closes the connecting passage 193, which connects the first section chamber 191 and the second section chamber 192. In other words, the driving decompression valve 185 is closed.

As a result, the first driving chamber decompression passage 181a and the second driving chamber decompression passage 181b are not connected to each other when the interior of the driving chamber 110 is not in the excessively high-pressure state. Therefore, the refrigerant in the driving chamber 110 is only sent to the suction chamber 115 through the bleeding passage 105 shown in FIG. 3 and the present driving chamber decompression means 180 is not used.

Because higher-pressure refrigerant is used during operation of the heating circuit than during operation of the cooling circuit, when the high-pressure refrigerant is released from the discharge chamber 120 into the driving chamber 110 so as to decrease the discharge pressure by decreasing the output discharge capacity during operation of the heating circuit, the pressure in the driving chamber 110 may exceed an expected permissible value and may be brought into the excessively high-pressure state in some cases. In such a case, a concern that the airtight seal of the driving chamber 110 could be damage is raised. Particularly, the airtight seal at a sealing portion of the driving shaft 125 shown in FIG. 3 is liable to be damaged.

In such a case, if the pressure Pc at the driving chamber descompression valve 185 in the first section chamber 191 exceeds the resultant of the suction pressure Ps and the biasing force of the spring 195, the valve body 194 moves to the right in FIG. 4. As a result, the valve body 194 separates from the valve seat 194a and opens the connecting passage 193. In other words, the driving chamber decompression passage 185 is opened by the difference between the pressure Pc in the driving chamber 110 and the suction pressure Ps and the driving chamber 110 and the suction opening 116 can communicate with each other. Therefore, the refrigerant in the driving chamber 110 is released to the suction opening 116 and the excessively high-pressure state in the driving chamber 110 is resolved.

The driving chamber decompression valve 185 is opened by difference between the pressure Pc in the driving chamber 110 and the suction pressure Ps, thereby immediately releasing the refrigerant from the driving chamber 110 into the suction opening 116 to resolve the excessively high-pressure state in the driving chamber 110. The driving chamber decompression valve 185 is a releasing path that is completely separated from the bleeding passage 105 shown in FIG. 3. The refrigerant released to the suction opening 116 is drawn into the cylinder bore 109 through the suction chamber 115, suction hole 118a, and suction valve 118 shown in FIG. 3. After compression, the refrigerant is discharged through the discharge hole 123a, discharge valve 123, discharge chamber 120, and the discharge opening 121 and is sent to the heating circuit 152 again.

Because the high-pressure refrigerant is released from the driving chamber 110 to the suction opening 116, it is conceivable that the suction pressure Ps will increase temporarily to increase the discharge pressure Pd temporarily as a result of the release. However, the driving chamber decompression means 180 is provided as emergency escape passage for resolving the excessively high-pressure state in the driving chamber 110. Further, the increase in the suction pressure Ps can be minimized when an amount of the refrigerant released from the driving chamber 110 is small.

Moreover, because the compressor 101 is characterized in that not only a decrease in the discharge pressure Pd but also an increase in the suction pressure Ps of the refrigerant is obtained as an effect of the decrease in the output discharge capacity when the refrigerant is released from the discharge chamber 120 into the driving chamber 110 so as to decrease the output discharge capacity, a condition for opening the driving chamber decompression valve 185 opened by the difference between the pressure Pc in the driving chamber 110 and the suction pressure Ps is influenced by variation in the suction pressure Ps. With regard to this point, the condition for opening the valve is set by incorporating an increase amount of the suction pressure Ps into the strength of the spring 195.

The operation of the cooling circuit 151 (see FIG. 2) also will be described. The cooling capacity control valve 140 shown in FIG. 3 opens when refrigerant suction pressure is excessively low during operation of the cooling circuit 151 in order to open the cooling discharge capacity changing passage 107. Thus, refrigerant is introduced from the discharge chamber 120 into the driving chamber 110 to increase driving chamber pressure. By decreasing the output discharge capacity of the compressor 101, suction pressure is increased, thereby preventing frost from forming on the heat exchanger 159 (see FIG. 2), which may be caused when the suction pressure is excessively low.

On the other hand, as described above, the discharge pressure of the refrigerant is relatively lower during operation of the cooling circuit than during operation of the heating circuit. Therefore, even if the capacity control valve 140 is opened to release the refrigerant from the discharge chamber 120 into the driving chamber 110, the excessively high-pressure state in the driving chamber 110 is less liable to be generated. Furthermore, because the above-described condition for opening the driving chamber decompression valve 180 is set by taking operation of the heating circuit in which the driving chamber 110 is brought into the higher-pressure state into consideration, opening of the driving chamber decompression valve 180 during operation of the cooling circuit causes few problems.

In such an air conditioning system having a hot-gas bypass heater, reductions, in heating performance due to the release of refrigerant from the heating circuit into the cooling circuit to alleviate an abnormally high-pressure state do not occur. Also, energy efficiency is not significantly decreased due to wasteful releasing of the refrigerant at highly increased pressure to outside the heating circuit.

Moreover, the refrigerant is not released from the discharge side to the suction side to decrease the discharge pressure by the direct action of such release. Instead, a small amount of refrigerant is released into the driving chamber to increase the driving chamber pressure, decrease the inclination angle of the swash plate, decrease the piston stroke length and decrease the output discharge capacity, thereby decreasing the discharge pressure. With this structure, wasted system energy required to alleviate the abnormally high-pressure state of the discharge pressure is reduced to a minimum.

As shown in FIG. 3, although the driving chamber 110 is connected to the suction chamber 115 through the bleeding passage 105, the refrigerant released from the discharge: opening 121 builds up temporarily in the driving chamber 110 and is not released directly into the suction chamber 120. Therefore, the suction pressure Ps is prevented from increasing by being directly affected by release of the high-pressure refrigerant. As a result, a decreasing discharge pressure Pd can be maintained for a relatively long time. In this sense, by releasing the refrigerant into the driving chamber 110, the driving chamber 110 can be utilized as a reserve tank. Further, a decompression means 180 is provided to quickly reduce the driving chamber pressure if necessary.

The capacity control valve 140 is opened by a signal generated by a controller which is not shown in the drawings. The capacity control valve 140 is opened when the discharge pressure is detected to be brought into the abnormally high-pressure state. The abnormal high-pressure state of the discharge pressure is judged based on whether the discharge pressure value exceeds the reference value. The reference value may preferably be decreased in accordance with the increasing speed or acceleration of the discharge pressure in order to start the releasing of the refrigerant from the discharge chamber 120 to the driving chamber 110 at early stage of the abnormal high-pressure state.

As an alternative means for releasing the refrigerant form the discharge chamber 120 to the driving chamber 110, a valve which are opened and closed in accordance with a difference between the discharge pressure and the suction pressure or the driving chamber pressure may preferably be utilized in stead of the above-explained solenoid valve. Because of the simple structure of such valve, the total structure of the air conditioner can be simplified.

Moreover, the discharge chamber 120 and the driving chamber 110 may preferably be connected by a heating circuit discharge capacity changing passage and a cooling circuit discharge capacity changing passage. A heating circuit capacity control valve may be provided at a position within the heating circuit capacity changing passage and a cooling circuit capacity control valve may be provided at a position within the cooling circuit capacity changing passage. Above-explained valve opened and closed by the solenoid or the valve opened and closed by the different pressures may preferably be utilized for the heating and cooling circuit capacity control valve.

Second Detailed Representative Embodiment

Figure 5:
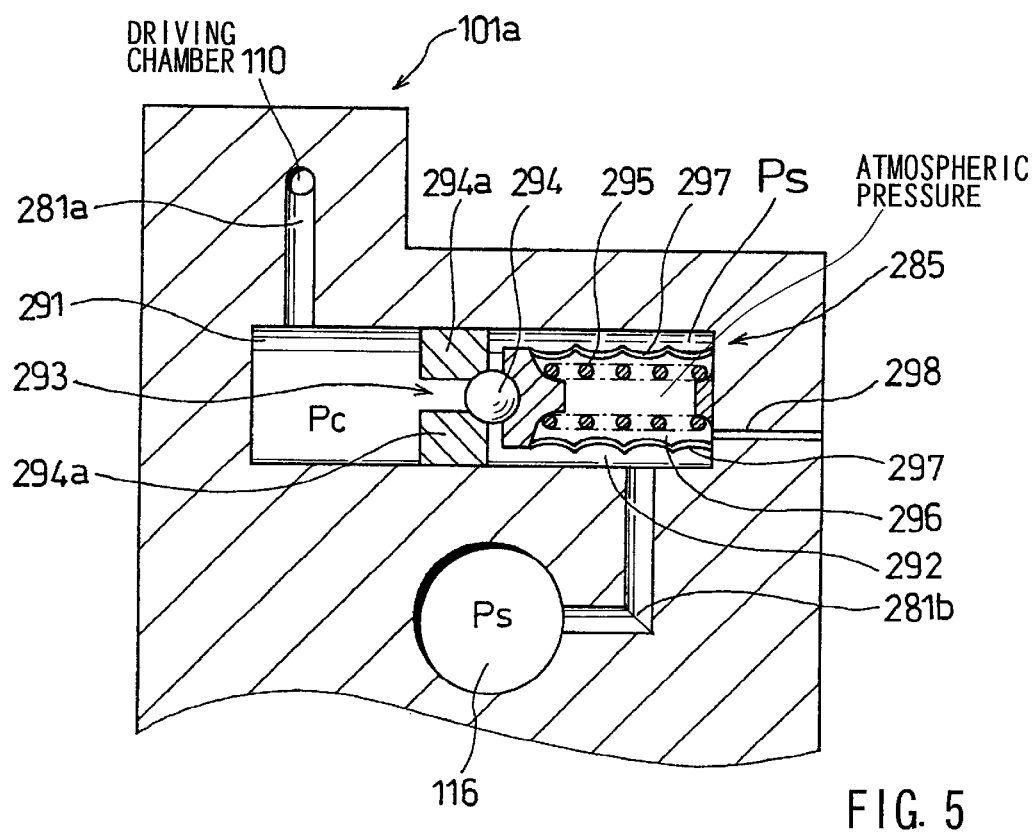
FIG. 5 shows a detailed structure of driving chamber decompression means according to a second embodiment.

In the second detailed representative embodiment, a pressure difference between the pressure Pc in the driving chamber 110 and atmospheric pressure is used as the differential pressure for opening the driving chamber decompression valve. For example, as shown in FIG. 5, in a driving chamber decompression valve 285 in this modification, a first section chamber 291 and a second section chamber 292 are provided. The first section chamber 291 may be connected to the driving chamber 110 through a first driving chamber decompression passage 281a. Therefore, the pressure in the first section chamber 291 is equal to the pressure Pc in the driving chamber 110. The second section chamber 292 is connected to the suction opening 116 through the second driving chamber decompression passage 281b. Therefore, the pressure in the second section chamber 292 is equal to the suction pressure Ps.

In the second section chamber 292, a third section chamber 296 defined by a bellows 297 and atmospheric pressure is introduced into the third section chamber 296 through passage 298. The first section chamber 291 and the second section chamber 292 are connected to each other by a connecting passage 293 and the connecting passage 293 is opened or closed by a valve body 294. The valve body 294 is biased to the left in FIG. 5 by a spring 295.

At the driving chamber decompression valve 285, when the inside of the driving chamber 110 is not in the excessively high-pressure state, the pressure Pc in the first section chamber 291 biases the valve body 294 to the right in FIG. 5. However, the resultant of the atmospheric pressure in the third section chamber 296 and the biasing force of the spring 295 stops the rightward movement of the valve body 294. Thus, the valve body 294 can not move. In this case, the valve body 294 contacts a valve seat 294a and closes the connecting passage 293 which connects the first section chamber 291 and the second section chamber 292. In other words, the driving decompression valve 285 is closed. As a result, the refrigerant in the driving chamber 110 is not released to the suction opening 116.

On the other hand, when the inside of the driving chamber 110 is brought into the excessively high-pressure state, the force of the pressure Pc in the first section chamber 291 exceeds the resultant of the atmospheric pressure in the third section chamber 296 and the biasing force of the spring 295 and pushes the valve body 294 to the right, as shown in FIG. 5. As a result, the valve body 294 which has been contacting the valve seat 294a moves to the right in FIG. 5 and opens the connecting passage 293 for connecting the first section chamber 291 and the second section chamber 292 to bring both the chambers into a communicating state. In other words, the driving chamber decompression valve 285 is opened. Thus, the refrigerant in the driving chamber 110 is released to the suction opening 116 through the connecting passage 293 and the excessively high-pressure state in the driving chamber 110 is resolved swiftly.

In the present representative embodiment, because the variation of the pressure Pc in the driving chamber 110 with respect to the atmospheric pressure, which is a fixed quantity, is accurately reflected in the difference between the atmospheric pressure and the pressure Pc, the refrigerant is accurately released when the interior of the driving chamber 110 is brought into the excessively high-pressure state.

Third Detailed Representative Embodiment

Figure 6:
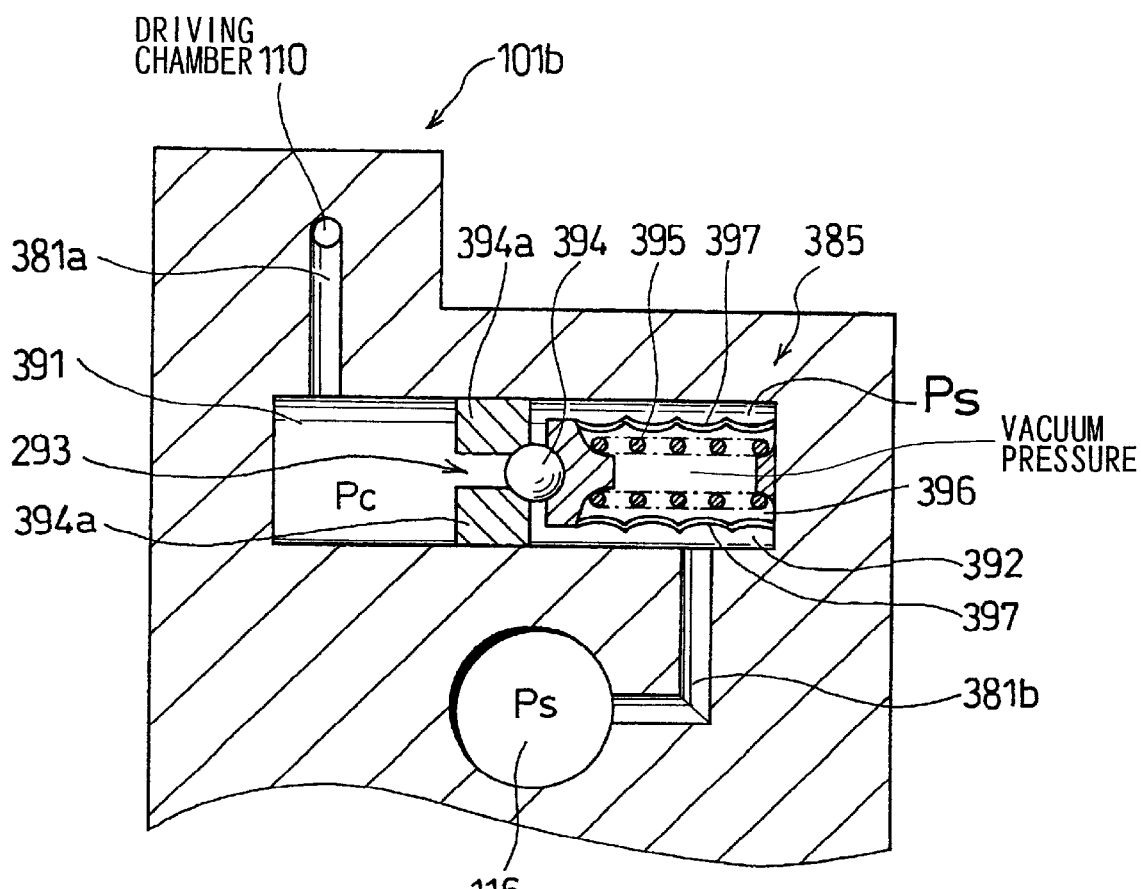
FIG. 6 shows a detailed structure of driving chamber decompression means according to a third embodiment.

In the third detailed representative embodiment, as shown in FIG. 6, a driving chamber decompression valve 385 is provided that can opened by differential pressure between the pressure Pc in the driving chamber 110 and a vacuum. A structure of the driving chamber decompression valve 385 is substantially the same as the structure in the above-described second representative embodiment, except that a third section chamber 396 defined by a bellows 397 is maintained under vacuum.

In the present representative embodiment also, because the variation of the pressure Pc in the driving chamber 110 with respect to the atmospheric pressure, which is a fixed quantity, is accurately reflected in the difference between the atmospheric pressure and the pressure Pc, the refrigerant is accurately released when the interior of the driving chamber 110 is brought into the excessively high-pressure state.

Forth Detailed Representative Embodiment

Figure 7:
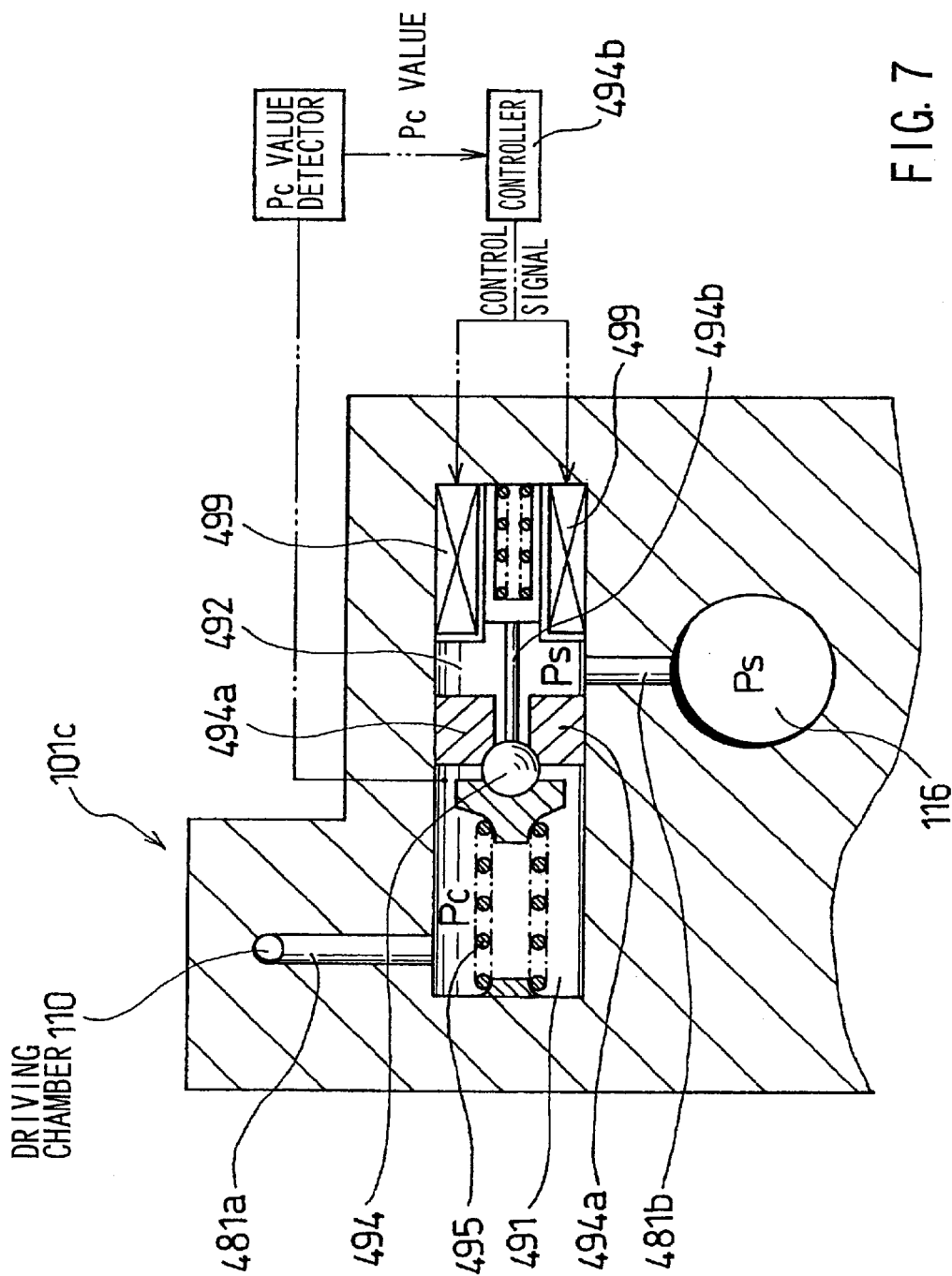
FIG. 7 shows a detailed structure of driving chamber decompression means according to a fourth modification.

In a fourth detailed representative embodiment, as shown in FIG. 7, the absolute pressure of the driving chamber pressure Pc in a first section chamber 491 connected to the driving chamber 110 through a first driving chamber decompression passage 481a is detected. Control means 494b determines whether the interior of the driving chamber 110 is in the excessively high-pressure state based upon the detected absolute pressure. If it is determined that the inside of the driving chamber 110 is in the excessively high-pressure state, a valve body 494 provided between the first section chamber 491 and a second section chamber 492 is opened by using a solenoid 499, thereby bringing both the chambers into a communicating state and releasing the refrigerant to the suction opening 116. In other words, a valve is not opened by a difference between higher pressure and lower pressure, but instead an outside control valve opened by outside signal transmission is employed.

Specifically, when the control means 494b determines that the detected Pc value exceeds a predetermined reference value, the control means 494b determines that the interior of the driving chamber 110 is in the excessively high-pressure state and generates a control signal, thereby energizing the solenoid 499. As a result, a spool 494a and the valve body 494 move to the left as shown in FIG. 7 against the resultant of the driving chamber pressure Pc in the first section chamber 491 and the biasing force of a spring 495. Consequently, the valve body 494 separates from valve seat 494a to bring both the chambers into the communicating state. Thus, the refrigerant in the driving chamber 110 is released to the suction opening 116 and the excessively high-pressure state in the driving chamber is resolved swiftly.

In the present embodiment, it is possible to accurately determine whether the interior of the driving chamber 110 is in the excessively high-pressure state based on a value of the pressure Pc in the driving chamber 110.

A one-sided swash plate type of compressor, i.e., a compressor having pistons 135 disposed on only one side of the swash plate 130 in FIG. 3, is used as the variable displacement compressor in above-explained representative embodiments. However, a double-ended piston type can also be used in the variable displacement compressor, in which pistons are connected to opposite sides of the swash plate for reciprocation. Further, although the decompression means 180 is disposed inside the compressor (i.e. within the housing), the decompression means 180 also can be provided outside the compressor. Finally, although the air conditioning system was described as having both a cooling circuit and a heating circuit in the representative embodiments, the cooling circuit may be removed, because the present teachings are preferably utilized to alleviate high pressure states within a heating circuit.

Further, although it is not particularly shown in the drawings, following features may be preferably employed to any of the representative embodiments.

First, means for releasing the refrigerant directly from the discharge area (discharge chamber 141 or discharge opening 143) into the suction area may preferably be provided. The refrigerant releasing means may preferably have a passage extending from the discharge area to the suction area and a refrigerant releasing valve provided on the passage. The refrigerant releasing valve is opened when the discharge pressure extremely increased such that the normal control by decreasing the compressor discharge capacity can not alleviate the extreme increase of the discharge pressure. Therefore, such means can be utilized as an emergent releasing means for decreasing the abnormal high-pressure state of the refrigerant.

Second, a controller that send a signal to the capacity control valve 140 shown in FIG. 3 such that the capacity control valve 140 is opened when the discharge pressure of the refrigerant exceeds the predetermined reference value and this reference value is decreased in accordance with a value related to change in the discharge pressure of the refrigerant. For example, changing speed or acceleration in the increase of discharge pressure may preferably be utilized as the value related to change in the discharge pressure as well as the multiple time differential value of the discharge pressure. Because the increasing discharge pressure may exceed the decreased reference value soon, the abnormal high pressure state of the discharged refrigerant can be alleviated at its early stage to prevent the air conditioning circuit being damaged.

What is claimed is:

1. An air conditioning system comprising:
   a compressor having a driving chamber, a suction port, a discharge port, a first passage for connecting the discharge port to the driving chamber by opening a capacity control valve, a second passage for connecting the driving chamber to the suction port, wherein compressed refrigerant may be released from the discharge port into the driving chamber to decrease the compressor output discharge capacity,
   a heating circuit having a heat exchanger and a passage extending from the discharge port to the suction port through the heat exchanger, and
   driving chamber decompression means that releases the refrigerant from the driving chamber to the suction port separately from the second passage when the driving chamber is brought into a predetermined high-pressure state.

2. An air conditioning system according to claim 1 further comprising a cooling circuit having a condenser disposed on a path extending from the discharge port to the suction port and said heat exchanger disposed downstream from said condenser.

3. An air conditioning system according to claim 1, wherein the driving chamber decompression means has a third passage extending from the driving chamber to the suction port and a driving chamber decompression valve provided on the third passage, and the driving chamber decompression valve is opened when the driving chamber is brought into the predetermined high-pressure state.

4. An air conditioning system according to claim 3, wherein the driving chamber decompression valve is opened by a difference between suction pressure and the pressure in the driving chamber when said difference increases.

5. An air conditioning system according to claim 3, wherein the driving chamber decompression valve is opened by a difference between atmospheric pressure or vacuum pressure and the pressure in the driving chamber when said difference increases.

6. An air conditioning system according to claim 1, wherein the driving chamber decompression means is provided within a housing of the compressor.

7. A method of using the air conditioning system according to claim 1 comprising the steps of:

releasing the refrigerant from the driving chamber to the suction port separately from the second passage when the driving chamber is brought into a predetermined high-pressure state.

8. An air conditioning system according to claim 1, wherein the compressor further comprises:

a swash plate connected to a driving shaft disposed within the driving chamber, the swash plate rotating together with the driving shaft at an inclination angle with respect to a plane perpendicular to the driving shaft and a piston disposed in a cylinder bore, an end portion of the piston connected to a peripheral edge of the swash plate by means of a shoe, the piston reciprocating in the cylinder bore to compress the refrigerant in response to rotation of the swash plate in the driving chamber of the compressor.

9. A vehicle comprising an air conditioning system according to claim 1 and an engine for driving the compressor.

10. A method for controlling pressure in a driving chamber of a compressor in an air conditioning system, the compressor having a driving chamber, a suction port, a discharge port, a bleed passage for connecting the driving chamber to the suction port, wherein compressed refrigerant may be released from the discharge port into the driving chamber to decrease the compressor output discharge capacity, and a driving chamber decompression passage that releases refrigerant from the driving chamber to the suction port separately from the bleed passage, the method comprising the step of releasing refrigerant from the driving chamber to the suction port of the compressor via the driving chamber decompression passage.

11. A method according to claim 10, wherein the refrigerant is released from the driving chamber to the suction port by opening a driving chamber decompression valve provided in the driving chamber decompression passage extending from the driving chamber to the suction port.

12. A method according to claim 9, wherein the driving chamber decompression valve is opened by a difference between suction pressure and the pressure in the driving chamber when said difference increases.

13. A method according to claim 11, wherein the driving chamber decompression valve is opened by a difference between atmospheric pressure or vacuum pressure and the pressure in the driving chamber when the difference increases.

* * * * *

UNITED STATES PATENT AND TRADEMARK OFFICE
CERTIFICATE OF CORRECTION

PATENT NO. : 6,293,117 B1
DATED : September 25, 2001
INVENTOR(S) : Takashi Ban et al.

It is certified that error appears in the above-identified patent and that said Letters Patent is hereby corrected as shown below:

<u>Column 16,</u>
Line 15, please delete "according to claim 9" and insert therefor -- according to claim 11 --

Signed and Sealed this

Twenty-fifth Day of June, 2002

*Attest:*

JAMES E. ROGAN
*Attesting Officer*     *Director of the United States Patent and Trademark Office*